(12) United States Patent
Sturis

(10) Patent No.: US 8,060,600 B1
(45) Date of Patent: Nov. 15, 2011

(54) NETWORK ELEMENT MANAGEMENT SYSTEM

(75) Inventor: Steven N. Sturis, Leawood, KS (US)

(73) Assignee: Sprint Communications Company L.P., Overland Park, KS (US)

(*) Notice: Subject to any disclaimer, the term of this patent is extended or adjusted under 35 U.S.C. 154(b) by 827 days.

(21) Appl. No.: 11/681,575

(22) Filed: Mar. 2, 2007

(51) Int. Cl.
G06F 15/173 (2006.01)
H04L 12/50 (2006.01)
H04Q 11/00 (2006.01)
G06F 15/177 (2006.01)

(52) U.S. Cl. .................... 709/224; 370/357; 715/736

(58) Field of Classification Search .......... 709/223–224; 370/357; 715/736
See application file for complete search history.

(56) References Cited

U.S. PATENT DOCUMENTS

| | | | | | |
|---|---|---|---|---|---|
| 5,341,293 | A | * | 8/1994 | Vertelney et al. | 715/236 |
| 5,867,689 | A | * | 2/1999 | McLain, Jr. | 703/23 |
| 5,954,829 | A | * | 9/1999 | McLain et al. | 714/712 |
| 6,400,713 | B1 | * | 6/2002 | Thomas et al. | 370/355 |
| 6,957,263 | B2 | * | 10/2005 | Galou et al. | 709/227 |
| 7,139,244 | B1 | * | 11/2006 | Cordsmeyer et al. | 370/250 |
| 7,185,075 | B1 | * | 2/2007 | Mishra et al. | 709/223 |
| 7,363,359 | B1 | * | 4/2008 | Tripathy et al. | 709/223 |
| 2004/0196309 | A1 | * | 10/2004 | Hawkins | 345/738 |

OTHER PUBLICATIONS

Tellabs. "Tellabs MetroWatch", publicly posted to the Internet Jan. 13, 2006, 2 pages.*
Case, J. et al. "Request for Comments (RFC) 1905: Protocol Operations for Version 2 of the Simple Network Management Protocol (SNMPv2)", published by Network Working Group, Jan. 1996, 25 pages.*
Tellabs, Inc. "Tellabs 5500 Digital Cross-Connect", publicly posted to the Internet Jan. 4, 2006, 2 pages.*
Tellabs, Inc. "Tellabs 5500 Digital Cross-Connect System (DCS) Integrated Voice Quality Enhancement (IVQE)", Mar. 2006, 2 pages.*
Fowler, Henry J. "TMN-Based Broadband ATM Network Management", IEEE Communications Magazine, Mar. 1995, pp. 74-79.*
Tellabs, Inc. "Tellabs 5500 NGX Transport Switch Series", Nov. 2003, downloaded from studiozla.com, 4 pages.*

* cited by examiner

Primary Examiner — George Neurauter

(57) ABSTRACT

A network element management system has a user interface that displays a table having a plurality of rows and a plurality of columns. The table has a plurality of logical identifier for a network element listed in the first column. The table has a plurality of physical dependencies listed in the first row. The table has at least one list of physical equipment displayed in a row containing a first logical identifier, where each piece of physical equipment in the list is linked to the first logical identifier and where each piece of physical equipment is located in a column that corresponds to the physical dependency which the physical equipment fulfills.

16 Claims, 3 Drawing Sheets

|  | Physical Layer (the columns) | | | | |
|---|---|---|---|---|---|
| Logical Layer (the rows) | | | | | |
| | | | | | |
| | | | | | |
| | | | | | |
| | | | | | |
| | | | | | |
| | | | | | |
| | | | | | |
| | | | | | |
| | | | | | |

Figure 1

| SDF | Working | Protect | ESM | TSI | Mapping | Power |
|---|---|---|---|---|---|---|
| 1 | 81.5514D | 81.5514D | 81.5509 | 81.5516D | | 8X.5535 |
| 2 | 81.5514D | 81.5514D | 81.5509 | 81.5516D | | 8X.5535 |
| 3 | 81.5514D | 81.5514D | 81.5509 | 81.5516D | | 8X.5535 |
| 4 | 81.5514D | 81.5514D | 81.5509 | 81.5516D | | 8X.5535 |
| 5 | 81.5514D | 81.5514D | 81.5509 | 81.5516D | | 8X.5535 |
| 6 | 81.5514D | 81.5514D | 81.5509 | 81.5516D | | 8X.5535 |
| 7 | 81.5514D | 81.5514D | 81.5509 | 81.5516D | | 8X.5535 |
| 8 | 81.5514D | 81.5514D | 81.5509 | 81.5516D | | 8X.5535 |
| 9 | 81.5517A | 82.5517A | 81.5509 | 81.5519 | | 8X.5535 |
| 10 | 81.5517A | 82.5517A | 81.5509 | 81.5519 | | 8X.5535 |
| 11 | 81.5517A | 82.5517A | 81.5509 | 81.5519 | | 8X.5535 |
| 12 | 82.5517A | 82.5517A | 81.5509 | 81.5519 | | 8X.5535 |
| 13 | 82.5517A | 82.5517A | 81.5509 | 81.5519 | | 8X.5535 |
| 14 | 82.5517A | 82.5517A | 81.5509 | 81.5519 | | 8X.5535 |
| 15 | 82.5517A | 82.5517A | 81.5509 | 81.5519 | | 8X.5535 |
| 16 | 82.5517A | 82.5517A | 81.5509 | 81.5519 | | 8X.5535 |
| 17 | 82.5517A | 82.5517A | 81.5509 | 81.5519 | | 8X.5535 |
| 18 | 82.5517A | 82.5517A | 81.5509 | 81.5519 | | 8X.5535 |
| 19 | UEQ – DS3 | 82.5517A | 81.5509 | 81.5519 | | 8X.5535 |
| 20 | UEQ – DS3 | 82.5517A | 81.5509 | 81.5519 | | 8X.5535 |
| 21 | UEQ – DS3 | 82.5517A | 81.5509 | 81.5519 | | 8X.5535 |
| 22 | UEQ – DS3 | 82.5517A | 81.5509 | 81.5519 | | 8X.5535 |
| 23 | UEQ – DS3 | 82.5517A | 81.5509 | 81.5519 | | 8X.5535 |
| 24 | UEQ – DS3 | 82.5517A | 81.5509 | 81.5519 | | 8X.5535 |

NETWORK ELEMENT MANAGEMENT SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

This invention relates to telecommunication systems, and specifically to a network element management system.

2. Description of the Prior Art

A telecommunications network is typically comprised of a number of network elements. One example of a network element is a digital cross-connect system. A digital cross-connect system is a network device used by telecom carriers and large enterprises to switch and multiplex low-speed voice and data signals onto high-speed lines and vice versa. The digital cross connect is typically used to aggregate several T1 lines into a higher-speed electrical or optical line as well as to distribute signals to various destinations. For example, voice and data traffic may arrive at the cross-connect on the same facility, but be destined for different carriers. Voice traffic would be transmitted out one port, while data traffic goes out another.

Digital Cross-Connect Systems (DCS) typically consist of a rack with one or more shelves, where each shelf has a number of different cards/modules. The cards/modules can be configured to connect the incoming low speed lines with the outgoing high capacity lines. Over time the DCS may be upgraded by adding additional shelves and/or additional card/modules, or the DCS may be modified by reconfiguring the current cards/modules. To be able to upgrade or modify the DCS, an understanding of the current logical configuration of the DCS is required. The logical configuration of a DCS is the relationship between the current cards, shelves and modules, how the cards/modules and shelves relate to other cards/modules and shelves, and how the DCS logically identifies the links (logical identifiers) between the cards/modules and shelves.

Currently, determining the logical configuration of a DCS is a time consuming and error prone activity. One reason for this difficulty is that the physical location of a card/module in the shelf may not have any relationship with the logical configuration for the card/module.

Current software programs designed to aid with the determination of the logical configuration of a DCS may determine that a shelf has an open slot for a card/module, but do not determine the logical sub-distribution frame (SDF) address for the open slot. For example, the Tellabs 5500 Metro Watch product allows an engineer to determine that there are shelves installed with open slots for cards/modules, but it does not tell the engineer what the logical SDF address is for the slots and cards/modules.

Another problem with current management tools is that the physical dependencies between different cards/modules can not be determined. Therefore there is a need for a network element management system that overcomes these problems.

SUMMARY OF THE INVENTION

The present invention advances the art by providing a network element management system that has a user interface that displays a table having a plurality of rows and a plurality of columns. The table has a plurality of logical identifier for a network element listed in the first column. The table has a plurality of physical dependencies listed in the first row. The table has at least one list of physical equipment displayed in a row containing a first logical identifier, where each piece of physical equipment in the list is linked to the first logical identifier and where each piece of physical equipment is located in a column that corresponds to the physical dependency which the physical equipment fulfills.

BRIEF DESCRIPTION OF THE DRAWINGS

FIG. 1 is a display screen for a network element management system in an example embodiment of the invention.

FIG. 2 is a display screen of a network element management system showing the logical configuration of a DCS in an example embodiment of the invention.

FIG. 3 is a partial display screen of a network element management system showing capacity and inventory information in an example embodiment of the invention.

DETAILED DESCRIPTION OF THE PREFERRED EMBODIMENT

Figure 3:
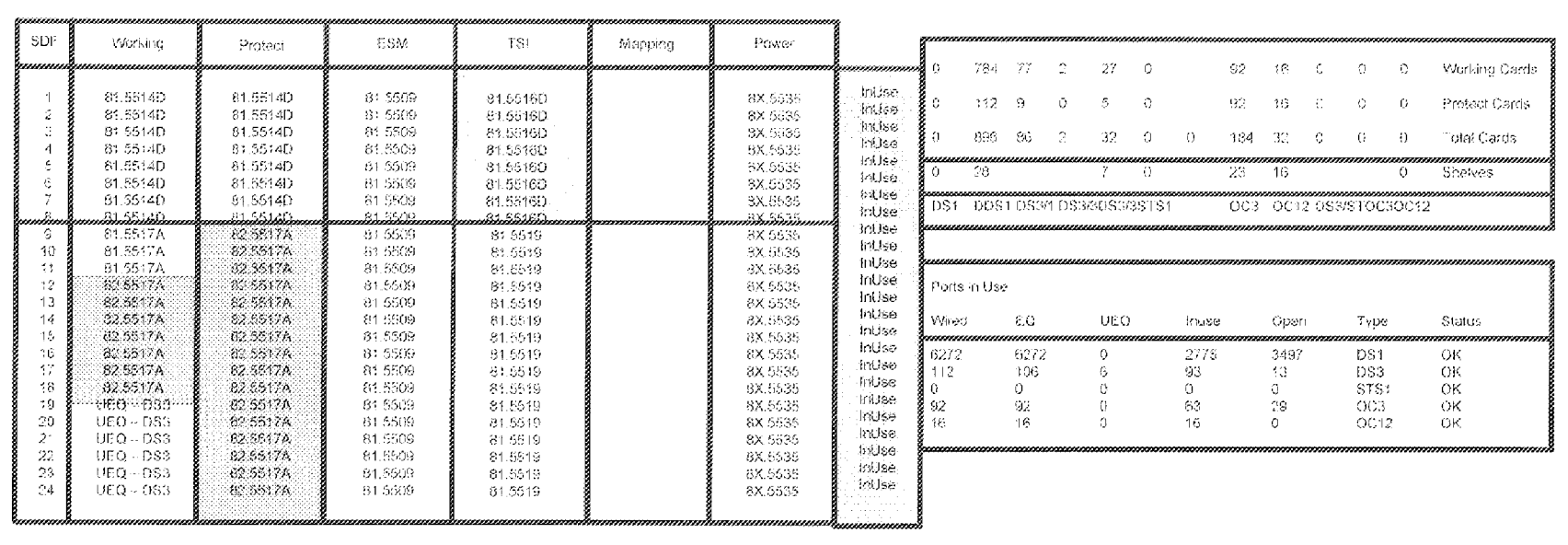

FIGS. 1-3 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

In one example embodiment of the invention, a display that relates the logical layer of a network element to the physical layer of the network element is used to convey the logical configuration of the network element. FIG. 1 is a display screen for a network element management system in an example embodiment of the invention. The display screen uses a matrix or table to relate the logical layer to the physical layer. FIG. 1 shows the logical layers as the rows and the physical layer as the columns, but they can be switched with the logical layer displayed along the columns and the physical layer displayed along the rows. The logical layer lists the logical identifiers of a network element down the first column. The physical layer shows the physical equipment dependencies along the top row and the physical elements for a logical identifier along a row corresponding to the given logical identifier. Relating the logical layer to the physical layer using a matrix or table can be done for a variety of network elements including digital cross connect systems (DCS), add-drop multiplexers (ADM), switches and the like.

FIG. 2 is a display screen of a network element management system showing the logical configuration of a DCS in an example embodiment of the invention. The DCS shown in FIG. 2 is a Tellabs 5500 Digital Cross Connect System. Network element management system is not limited to a Tellabs 5500, but may be used with a number of other Digital Cross Connect Systems including: an Alcatel 1631s, a Sycamore 16K, a Tellabs 5320L, and the like.

In FIG. 2 the sub-distribution frame (SDF) numbers of the first column is the "logical layer". The rows are the "physical layer" (the physical cards/modules associated with the SDF#s). Each row represents a unique SDF number (logical identifier) that has physical equipment tied, linked or associated to it. A "logical identifier" is an identifier that the network element uses to classify each unique unit of memory/bandwidth/capacity.

In the data storage field, a "Megabyte" is a unit of measurement for 1024 kilobytes of memory in computer hard drive. The computer assigns a unique identifier (i.e. memory address) for each megabyte. In the data storage field, the logical identifiers are what the computer uses to identify each megabyte of memory. In the telecommunications field, the logical identifier for a Tellabs 5500 Digital Cross Connect System is an SDF, which is a unit of measure for one DS3 of capacity. The Tellabs 5500 assigns each SDF a unique number so it can logically identify each unit of capacity (i.e. each DS3). Other network elements use different names for the logical identifiers, for example an Alcatel 1631s uses T3 as it's logical identifier, and a Tellabs 5320L uses MPC as it's logical identifier.

The first row of the table lists the physical dependencies for the network element. In FIG. 2 the first row of the table lists the physical dependencies of the Tellabs 5500 DCS. The physical dependencies for the Tellabs 5500 DCS are: a working card, a protect card, an end stage module (ESM), a time slot interchange (TSI) card, a mapping module and a power module.

The text in the rows corresponding to a given SDF number represents the physical equipment tied or linked to that SDF number. Each piece of physical equipment that is linked to the SDF number is shown in the column that represents the function that that piece of equipment fulfills. In one example embodiment of the invention, the text in the physical layer rows are the part numbers of the cards/modules associated or linked to that SDF number. In other example embodiment of the invention, the text in the physical layer rows may be the type of card, for example a DS1 card. The display screen provides a list of the different physical cards/modules associated with each logical identifier (SDF#) and shows the function that card/module fulfills. For example, a card with part number 81.5514D is associated or tied to SDF number 1 and is used as the working card. Part number 81.5514D corresponds to an electrical DS1 card. The working DS1 card is protected by another DS1 card. Logical identifier 1 (SDF-1) also is equipped with an end stage module (ESM) (part number 81.5509) which is required to make the DS1 working and DS1 protect cards functional. A time slot interchange (TSI) card (part number 81,5516D) is also associated with logical identifier 1 (SDF-1). The TSI card helps the ESM communicate with the DS1 cards. A power card (8X.5535) is also associated with logical identifier 1 (SDF-1) providing power to all the other cards/modules associated with SDF number 1. The mapping column is empty because all the SDF numbers are currently loaded with electrical cards. If any SDF number had an optical card associated or linked to it, a mapping module would be required to make the optical card functional.

By showing the dependencies and relationships between the logical layer and the physical layer, provisioning, monitoring and maintenance of network elements is simplified. FIG. 2 shows the network element management system configured to display the logical configuration of a Tellabs 5500 Digital Cross Connect System. When the network element management system is configured to display the logical configuration of a different network element, for example an Alcatel 1631 LMC, the column names would change to represent the types of physical dependencies for that specific network element.

In one example embodiment of the invention, different shades or different colors may be used to show cards/modules of the same type. For example, all the UEQ-DS3 cards are shown using a white background and all the 81.5514D cards are shown using a darker grey background. A different color or shade may also be used to distinguish between optical and electrical cards.

The network element management system produces several advantages and benefits that are not available in other reports, software packages or configuration tools. For example, the Tellabs 5500 Metro Watch product allows an engineer to determine that there are shelves installed with open slots for cards/modules, but it does not tell the engineer what the logical SDF address is for the slots and cards/modules. The engineer also does not know if other dependent cards/modules are installed that are tied to that SDF address. In contrast, the network element management system of the current invention provides all of this information. In another example, an engineer can use the Megasys Telenium 5500 product to graphically locate where a card and shelf can be installed, but the engineer must manually examine all the graphics for the open shelf/slots. This is a tedious process. In addition, the engineer must also have a good understanding of the physical card dependencies. Once the engineer finds the open shelf/slots they must search all the graphics again to see if the dependent cards are installed. The process is extremely time consuming, riddled with human error, and it can not be automated. In contrast, the network element management system quickly provides all of this information right at the finger tips of the engineer. In addition, network elements can be analyzed for government violations and/or business policy violations. For example, a quick scan of the table can identify unprotected cards/modules or missing/incorrect dependent cards.

Network risk analysis can be performed using the network element management system. For example, by scanning the table (either by human eye or by a computer) a report can be generated to identify network elements beyond safe thresholds, how many DS3s are dependent on high risk cards (card out of warranty, cards failing more than usual, etc) and where the DS3s are located. Any number of risk analyses can be performed. Database audits can be done for both physical and logical configurations. Provisioning circuits through a network element requires the database to have both the physical equipment and the logical address of the equipment. No product other than the network element management system can be used to simultaneously audit a provisioning database for both the physical and logical configuration.

The network element management system can also be used to produce conventional capacity analysis and inventory management information. FIG. 3 is a partial display screen of a network element management system showing capacity and inventory information in an example embodiment of the invention. The "in use" column displays which SDFs are currently being used by the system. FIG. 3 shows that SDF 1-24 are currently in use. The "ports in use" section provides the capacity and utilization report. FIG. 3 shows that 6,272 ports are wired as DS1 modules, 6,272 ports are equipped (EQ) with a DS1 module, zero ports are un-equipped (UEQ) with a DS1 module, and 2775 of those ports are currently in use, leaving 3497 DS1 ports available. The upper right hand section of the display is the inventory section and provides the cards/module counts for the network element. FIG. 3 shows that 28 shelves for DDS1 are installed in the network element. A total of 896 cards are loaded into the DDS1 shelves where 784 of the cards are working cards and 112 of the cards are protect cards.

In one example embodiment of the invention, the network element management system is implemented using a spreadsheet program, running on a computer, where macros are used to interrogate the network element and the results of the macros are displayed in the cells of the spreadsheet. In other example embodiments of the invention, the network element management system is implemented using a programming language that creates a user interface on a display screen that displays a table having a plurality of rows and a plurality of columns that relates the logical layer of a network element to the physical layer of the network element.

I claim:

1. A network element management system, comprising:
   a computer configured to interrogate a network element to determine a plurality of logical identifiers and a plurality of physical dependencies of pieces of physical equipment associated with the network element;
   the computer configured to process the logical identifiers and the physical dependencies to determine a relationship between the logical identifiers and the physical dependencies;
   a user interface display configured to display a table having a plurality of rows and a plurality of columns;
   wherein the plurality of logical identifiers for the pieces of physical equipment of the network element are listed in a first column of the plurality of columns;
   wherein the plurality of physical dependencies for the pieces of physical equipment of the network element are listed in a first row of the plurality of rows;
   at least one list of the pieces of physical equipment displayed in one of the plurality of rows containing a first one of the plurality of logical identifiers, where each piece of physical equipment in the list of pieces of physical equipment is linked to the first one of the plurality of logical identifiers and where each piece of the physical equipment in the list of the pieces of the physical equipment is located in a column that corresponds to the physical dependency which the piece of physical equipment fulfills.

2. The network element management system of claim 1 where the network element is a digital cross-connect system (DCS).

3. The network element management system of claim 2 where the physical dependencies comprise: working, protect, end stage module (ESM), a time slot interchange (TSI) and power.

4. The network element management system of claim 1 where the plurality of logical identifiers are selected from the group: sub distribution frame (SDF) numbers, T3 numbers, NPC numbers.

5. The network element management system of claim 1 where the at least one list of the pieces of physical equipment comprises a list of card/module part numbers.

6. The network element management system of claim 5 where the list of card/module part numbers are displayed using a different background for each different card/module part number.

7. The network element management system of claim 1, further comprising:
   an in-use column where indices located in the in-use column corresponding to a logical identifier indicate if that the logical identifier is currently passing traffic.

8. The network element management system of claim 1, further comprising:
   a second table having a list of a plurality of types of the pieces of physical equipment usable by the network element displayed along a first axis and a list of the quantity of the plurality of types of the pieces of physical equipment displayed along a second axis where each location in the table displays the quantity for one of the plurality of types of the pieces of physical equipment contained in the network element.

9. A method for managing a network element, comprising:
   in a computer, interrogating the network element to determine a plurality of logical identifiers and a plurality of physical dependencies of pieces of physical equipment associated with the network element;
   in the computer, processing the logical identifiers and the physical dependencies to determine a relationship between the logical identifiers and the physical dependencies;
   in a user interface display of the computer, displaying a table having a plurality of rows and a plurality of columns;
   wherein the plurality of logical identifiers for the pieces of the physical equipment of the network element are listed in a first column of the plurality of columns;
   wherein the plurality of physical dependencies for the pieces of the physical equipment of the network element listed in a first row of the plurality of rows;
   wherein at least one list of the pieces of physical equipment is displayed in one of the plurality of rows containing a first one of the plurality of logical identifiers, where each piece of the physical equipment in the list of the pieces of the physical equipment is linked to the first one of the plurality of logical identifiers and where each piece of the physical equipment in the list of the pieces of the physical equipment is located in a column that corresponds to the physical dependency which the piece of the physical equipment fulfills.

10. The method for managing a network element of claim 9 where the network element is a digital cross-connect system (DCS).

11. The method for managing a network element of claim 8 where the physical dependencies comprise: working, protect, ESM, TSI, Mapping and power.

12. The method for managing a network element of claim 9 where the plurality of logical identifiers are selected from the group: sub distribution frame (SDF) numbers, T3 numbers, NPC numbers.

13. The method for managing a network element of claim 9 where the at least one list of the pieces of physical equipment comprises a list of card/module part numbers.

14. The method for managing a network element of claim 8 where the list of card/module part numbers are displayed using a different background for each different card/module part number.

15. The method for managing a network element of claim 1, further comprising:
   in the user interface display of the computer, displaying an in-use column where indices located in the in-use column corresponding to a logical identifier indicate if that the logical identifier is currently active.

16. The method for managing a network element of claim 1, further comprising:

in the user interface display of the computer, displaying a second table having a list of a plurality of types of the pieces of physical equipment usable by the network element displayed along a first axis and a list of the quantity of the plurality of types of the pieces of physical equipment displayed along a second axis where each location in the table displays the quantity for one of the plurality of types of the pieces of physical equipment contained in the network element.

* * * * *